Dec. 4, 1945.  R. W. TEICHNER  2,390,473
TALCUM POWDER STICK
Filed Nov. 25, 1941
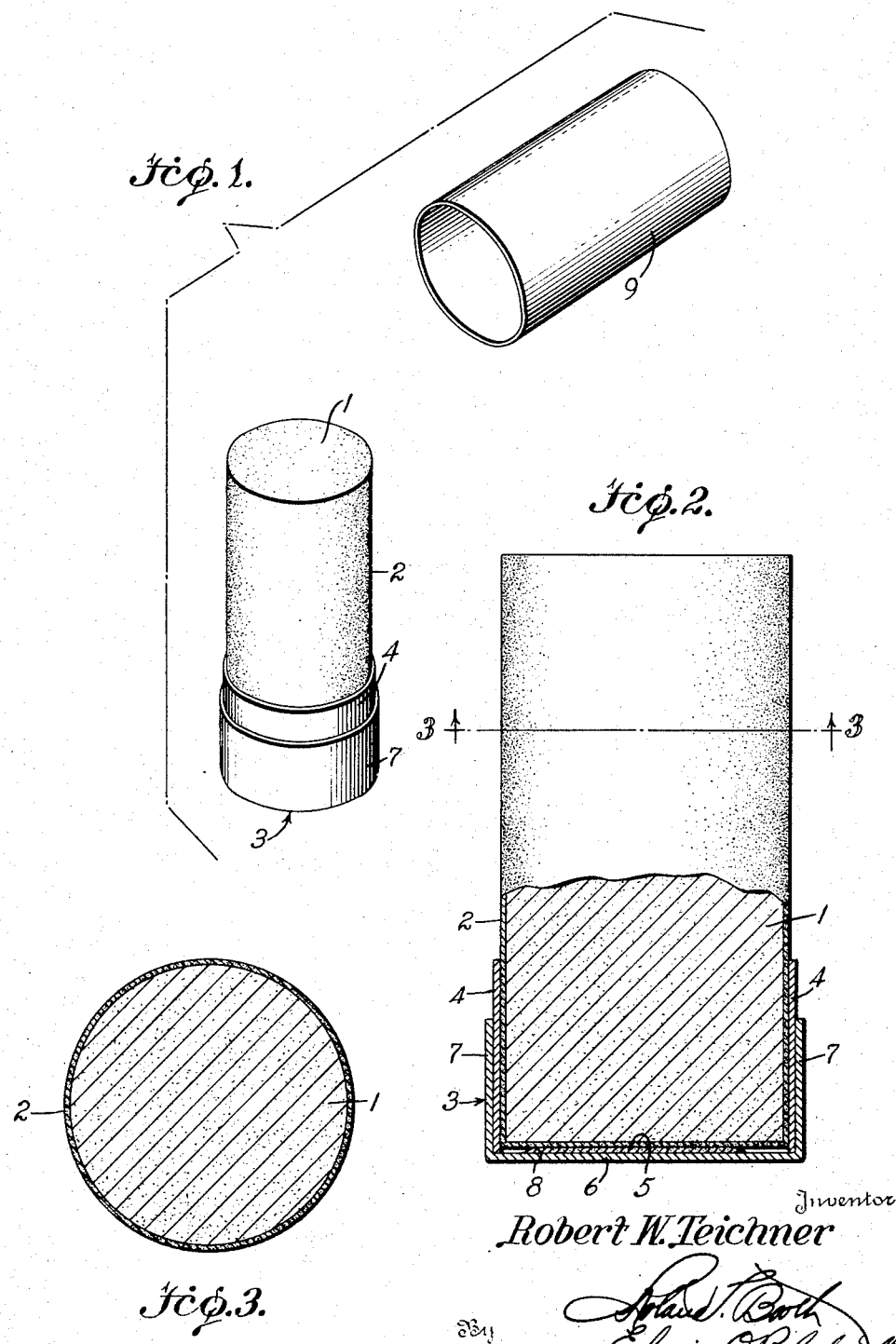
Inventor
Robert W. Teichner Patented Dec. 4, 1945

2,390,473

UNITED STATES PATENT OFFICE 2,390,473

TALCUM POWDER STICK

Robert W. Teichner, Bridgeport, Conn., assignor to Remington Rand Inc., Buffalo, N. Y.

Application November 25, 1941, Serial No. 420,390

12 Claims. (Cl. 206—56)

This invention relates to the provision of talcum powder in stick form.

The invention provides for a supply of talcum powder in the form of a stick constructed for immediate and convenient use by application to the surface of the skin so as to avoid waste of the powder and also to avoid the inconvenience of getting powder on the hands or clothes in order to apply it to the surface of the skin. The invention also provides for the direct application of the powder stick to the surface of the skin to apply a coating of powder to the skin without requiring the use of the usual powder puff or similar form of applicator. With the present invention the stick of talcum powder becomes its own applicator.

The invention is particularly designed to provide talcum powder in stick form for convenient use by men both before and after shaving. With the current use of electric dry shavers it is customary for many persons to shave after dressing or at any desired time without undressing. Since many men are accustomed to applying talcum powder to their faces after shaving, they desire to continue this practice and with the present forms of dry shavers many men find it desirable to apply talcum powder to their faces before shaving as well as after.

The present invention overcomes the disadvantages present in using loose talcum powder in connection with shaving due to the powder dropping on the clothing when one desires to shave while dressed. It also eliminates the coating of the hands with the powder in order to apply it to the face either before or after shaving.

With the present invention a man can grip the handle at one end of the shaving stick forming the invention and apply the opposite end to the surface of the face on which the powder coating is desired, so that by a rubbing action of the end of the powder stick over the surface of the skin the powder is rubbed off to apply the desired coating on the face either before or after shaving, or both, as may be desired.

The invention provides a powder stick wherein a bar of talcum powder is encased and retained in bar form by a suitable form of coating forming a case about the sides of the bar having the material of this coating or casing provided with sufficient strength to effectively retain the powder in bar form and yet when one end of the bar is rubbed over the surface of the face it will wear off the coating or casing at the end of the bar as the talcum powder is rubbed off of the end of the bar onto the face, or other surface of the skin to which the talcum is to be applied. This rubbing or wearing off of the coating or casing on the talcum powder bar will continue throughout the entire use of the stick of talcum powder until it is entirely consumed. However, the talcum powder remaining in the stick in bar form will be effectively retained against cracking, chipping and disintegrating at the edges of the bar on the end thereof that is rubbed over the skin during the application of the powder. The powder is also formed in the bar in such a manner that a rubbing action is necessary in order to remove the powder from the end of the bar for coating the surface of the skin. At the same time, however, the consistency of the powder in the casing will permit of ready removal of the powder to coat the skin without injury.

In the drawing:

Figure 1 shows the powder stick in perspective with the cover removed and shown in perspective at one side thereof.

Figure 2 is a side elevation of the powder stick enlarged to approximately twice its normal size and having the lower end including the handle structure broken away and shown in cross section to illustrate details of construction.

Figure 3 is a cross section taken on line 3—3 of Figure 2.

The proportion or dimension of the coating or casing applied to the powder bar as shown in Figure 2 of the drawing is substantially enlarged and exaggerated from its normal thickness in order to clearly illustrate the structure of the powder stick.

The powder stick of this invention has a bar of talcum powder indicated at 1 formed from a suitable and desired character of talc in powder form, the fineness of which may be determined by well known methods in the art such as the screening of the powder through a suitable size of mesh. The powder may have suitable coloring matter combined therewith in a manner well known in the art. The powder may also be perfumed or scented with suitable ingredients also obtained by means well known in the art.

The talcum powder material when suitably selected and combined in powder form with the desired characteristics as above suggested, is then compressed into bar form of any suitable shape, the structure illustrated in the drawing being in the form of a cylindrical bar in which the length is approximately twice its diameter. It will be understood, however, that the bar may be made of greater length with reference to its diameter or of less length if desired, it being preferred to so construct the bar of talcum that it will have a sufficient length in order that one end may be used in applying the powder to the surface of the skin by rubbing the powder off onto the skin from the end. The length of the bar will provide sufficient powder to last a substantial length of time before it is entirely worn or rubbed away.

As a result of many experiments it has been found that when powder is provided in stick form it is preferable to have the particles of powder intimately associated in order for the powder to remain in stick form so that it may be handled and used by rubbing the powder off of one end of the stick onto the surface of the skin on which a coating of powder is desired. It has, therefore, been found desirable to compress the powder in providing a bar structure of the powder having the desired degree of hardness. In the formation of bars of powder alone, experiments have shown that when the consistency of the bar was soft enough for the powder to rub off to apply a coating to the skin, it was of sufficiently weak construction that it would crumble, chip and crack in use. As a result of the crumbling, chipping and cracking, the bar would disintegrate before the powder could be rubbed off as a coating on the surface of the skin and, therefore, considerable waste resulted. It also was disagreeable to handle because it would rub off on the hands and the chips and crumbling portions would not only waste the powder but provide an undesirable coating on the clothing of the user or cover the adjacent furnishings of the building or floor creating an undesirable result.

Binders were used in the powder in forming a bar of powder in various proportions with a view of eliminating the crumbling, chipping and cracking of the bars after their formation and during handling and use. This resulted in the production of powder bars wherein the powder was difficult to rub off on the skin so as to provide a powder coating. Where the binders were used, the greater the content of the binder used in the powder, the more disagreeable and inefficient were the properties of the bar in applying powder to the skin thereby producing an undesirable result.

It was, therefore, found that compressing powder without binder, or only a small portion of binder, under desired pressure into bar form, would provide a bar of powder that would enable its being handled in a preliminary manner for the manufacture of the powder stick disclosed and described herein.

The compressed powder bar is then coated or covered with a protective film or casing indicated at 2 in the drawing over the outer surfaces of the side walls. This casing or coating may be applied in any desired manner. It is found to be convenient to provide the coating material in the form of a liquid of such consistency that it may be sprayed or brushed onto the surface of the bar of powder, or applied thereto by dipping the bar of powder into the liquid.

The material of the coating or casing for the powder bar is preferably formed from a suitable material that will wear away with the powder when it is rubbed over the surface of the skin to which the coating of powder is to be applied, in order that the surface of the powder at one end of the bar will be constantly level, or substantially so, with the end of the coating or casing about the powder at all times during the application of the powder to the skin. This coating will constantly wear away in the rubbing action on the skin with the powder.

This character of a protective casing or coating on the bar of powder is obtained through the use of any one of several well-known materials, commonly referred to as plastics, such as resin, synthetic resins, phenolic condensation products, cellulose esters, cellulose ethers, starch esters, chlorinated rubbers, synthetic rubbers, many of the polymers of the aforementioned substances which will include the polymers of vinyl acetate and vinyl chloride and a co-polymer of vinyl acetate and vinyl chloride all well known organic film forming materials.

For example, a synthetic resin such as the polymers of vinyl acetate and vinyl chloride or a combination thereof, may be dissolved in a suitable solvent such as ethyl acetate to form a solution of a desired viscosity such as may be obtained through the dissolving of 12 parts by weight of the polymer of vinyl acetate in 100 parts by weight of ethyl acetate. Such a solution is easily applied by spraying on the talcum powder bars 1 in order to provide the coating illustrated at 2 for retaining the powder in bar form against cracking, crumbling and chipping.

The above mentioned substances are included in the classes known as thermosetting and thermoplastic plastic compositions. It will be understood that materials from either group, such as those above mentioned, may be used.

Similar solutions of the other substances above mentioned may be made with the above mentioned or other similar and suitable solvents of a character well-known in the art, to obtain the desired viscosity for either brushing, spraying or dipping of the powder bars 1 in order to provide the coating 2 thereon. It is also to be understood that resin may be melted with heat to the desired viscosity and suitably applied to the surface of the powder bars 1 to form the film 2 thereon by dipping, spraying, brushing or the like.

It will be understood that any desired pressure for compressing the powder into the bar 1 may be used so as to compact the powder into bar form of a suitable hardness for having the desired powdering consistency that is convenient for its being rubbed off from the end of the bar onto the surface of the skin by rubbing the end of the bar over the skin. It has been found that pressures varying from 450 to 600 lbs. per square inch in an ordinary press have been sufficient to obtain the compression of various types of talcum powders into bar form for the construction of powder sticks according to this invention that have satisfactory powdering characteristics after they were suitably coated, as above described.

The thickness of the coating may be varied to provide a casing for the powder of sufficient strength to retain the bar of powder in shape against crumbling, chipping and the like. The thickness of the casing, however, is usually maintained at a minimum so that a rather thin film of coating material encases the bar of powder in order to make the wearing consistency of the casing substantially uniform with the powder.

The coating or film 2 is to be formed of the materials previously mentioned which are processed to dry or set after applying to the surface of the compressed powder 1 and adhere thereto to form a smooth outer surface. This outer surface of the coating 2 is not softened or dissolved by the ordinary heat and moisture to which it may be subjected in normal use, and the coating is also arranged to possess considerable resistance against fracture or disintegration while it is backed up or supported by the compressed powder 1. However, as the powder wears away from the end of the stick, the coating around this worn-away powder is also worn away substantially simultaneously as removal of the powder adjacent the inside surface of the coating allows the coating to disintegrate and wear away by the same movement over the face which wears away the powder.

In order to complete the powder stick construction in a convenient manner for handling and normal use, such as by men in connection with shaving, as well as for other personal uses, one end of the stick is provided with a handle 3. The handle is formed of suitable sheet material such as cardboard or the like that will normally retain its shape and provide a protection for one end of the stick as well as a handle by which it may be grasped in the hand so that the opposite end can be rubbed over the surface of the skin in applying the powder thereto. The handle illustrated in the drawing has a tubular member 4 of sheet material such as cardboard or the like secured in telescoped relation over one end of the coated powder bar so as to embrace the outer surface of the coating in the manner shown in Fig. 2. Fig. 2 also shows the coating 2 as extending over the end of powder bar 1 mounted in the handle. This portion of the coating is indicated by the numeral 5. An outer handle member has an end member 6 and an annular marginal flange 7 receiving tubular member 4 therein in rigidly mounted relation to complete the handle structure. A suitable adhesive, or the like, indicated by the numeral 8 may be used to secure the composite handle structure to the end of coated bar 1 in forming the stick structure.

It will be noted that the length of the marginal flange 7 is less than the length of tubular member 4 so that in the assembled relation of these members to form the handle tubular member 4 has the inner end providing a lip cooperating with the free end of marginal flange 7 to form a seat on the inner end of the handle.

A cover 9 formed from tubular sheet material closed at one end and having the opposite end open, is provided so that it may be engaged over the end of coated bar 1 opposite handle 3 for entirely enclosing the coated bar of powder when the same is not in use in order to protect it. The open end of cover 9 is adapted to slidably engage over the extending end portion of tubular member 4 of the handle so as to engage the end of annular flange 7. When the cover is mounted in this manner on handle 3, it encloses the coated powder bar and thereby provides a powder stick structure that can be packed in traveling bags and the like in such a manner that the cover and handle protects the powder bar against damage in transport and also against the powder being rubbed off when packed with other toilet articles, clothes or the like.

It will, therefore, be seen that the present invention provides a powder stick construction wherein cover 9 may be readily and manually removed from handle 3 to expose the coated powder stick 1. When the powder stick 1 is exposed with the handle 3 held in the hand of the user, the user may apply powder to any desired part of the surface of the skin by rubbing the free end over the skin where the coating of powder is desired. The consistency of the powder is such that this rubbing action will rub powder off of the end of the stick and cause it to be deposited on the surface of the skin in a convenient manner, and at the same time wearing away the end of the coating or casing 2 simultaneously with the wearing away of the powder. Repeated use of the stick in this manner will gradually wear away the end of the coated bar of powder until it wears down to the end of the handle portion or the end of tubular member 4. When this point is reached the user may also consume the remaining portion of the stick of powder by removing the handle. When the handle is made of suitable cardboard or similar material it may be cut off with a knife or the like and removed from the end of the coated bar so that the remaining portion of the end of the coated bar may be continued in use until the powder is entirely consumed.

It is, of course, to be understood that where desired it is not necessary to provide the bar of powder with a handle 3 since the coating 2 is sufficient to maintain the powder in bar form during use. However, the provision of the handle and cover for the coated bar of powder provides a composite powder stick construction that makes for a most convenient supply of talcum powder so that it may be readily used without soiling the hands with the powder or having it dusted or precipitated upon adjacent clothing or the like.

The powder stick described above has been found to provide a most convenient form of talcum powder for use before and after shaving by men who are now using the well-known dry shavers, as well as by men using other methods of shaving, where they desire to apply talcum powder to their faces after shaving. The powder is merely picked up by the handle or the end provided with the handle so that the opposite end which is free from coating 2 may have the bar of powder rubbed over the surface of the face either before or after shaving, when used for this purpose, to apply the desired coating of powder to the face.

The invention claimed is:

1. A talcum powder stick, comprising a bar of talcum powder having the powder particles in compressed, closely associated relation so as to retain the compressed shape but sufficiently fragile to disintegrate in handling during use without a retaining coating, and a coating of thin material encasing at least the sides of said bar and cooperating to retain said talcum powder particles in compressed bar form, the material of said coating being of such consistency that it will rub off at an end of said bar when said bar has the end rubbed over the surface of skin or the like to rub off talcum powder to coat the skin, said coating and talcum powder rubbing off said bar in substantially uniform relation.

2. A talcum powder stick, comprising a bar of talcum powder having a consistency capable of being rubbed off of said bar onto the surface of human skin to provide a powder coating on such surface said consistency being such as to retain the bar shape but sufficiently fragile to disintegrate in handling during use without a retaining coating, and a casing of thin frangible organic film forming material coating the surface of said bar and retaining said powder in bar form against chipping, breaking and the like, the material of said casing being of a character that it will rub off with said powder when the bar is rubbed over said skin surface to apply said coating thereon.

3. A talcum powder stick, comprising a bar of talcum powder compressed into a condition where it is friable without a retaining coating, a coating on the sides of said bar for retaining said powder in bar form, a handle attached to one end of said bar and coating having the major portion of said bar projecting therefrom, and said coating being formed of material that wears away when the opposite end of said bar is rubbed over a skin surface to apply a powder coating thereto.

4. A talcum powder stick, comprising a bar of talcum powder compressed to a point so as to be friable without a retaining casing, a casing embracing the sides of said bar to retain said powder formed of material that wears away with said powder when one end of said bar is rubbed over a skin surface to apply a coating of powder thereto, a handle attached to the opposite end of said bar and casing, and a cover removably engageable with portions of said handle for enclosing and protecting said bar when not in use.

5. A talcum powder stick, comprising a bar of talcum powder compressed to a point so as to be friable without a retaining casing, a casing embracing the sides of said bar to retain said powder in bar form formed of material wearing away with said powder when one end of said bar is rubbed over a skin surface to apply a coating of powder thereto, a handle formed of sheet material to provide an end member at the opposite end of said bar and casing, said handle having a marginal flange on said end member enclosing the sides of said casing, said handle also having a tubular member embracing the sides of said casing adjacent the last named end of said bar inside of said marginal flange and cooperating to mount said bar in said handle and a cover for the end of said bar projecting from said handle slidably engaged at its free end on said tubular member of the handle.

6. A talcum powder stick, comprising a bar of compressed talc so as to retain the compressed bar shape but sufficiently fragile to disintegrate in handling during use without a retaining coating and a thin coating of polymerized vinyl acetate embracing said talc and forming a composite bar for retaining said powder in bar form against cracking, chipping and crumbling and having the property of wearing away at the end of the bar with the powder when said stick has the end rubbed over the surface of the skin to apply a coating of talc thereto.

7. A talcum powder stick, comprising a bar of compressed talc compressed to a point to retain the bar shape and to be friable without a retaining coating, and a thin coating of polymerized vinyl chloride embracing said talc and forming a composite bar for retaining said powder in bar form against cracking, chipping and crumbling and having the property of wearing away at the end of the bar with the powder when said stick has the end rubbed over the surface of the skin to apply a coating of talc thereto.

8. A talcum powder stick, comprising a bar of compressed talc compressed to a point so as to be friable without a retaining coating and a thin coating consisting of copolymers of vinyl acetate and vinyl chloride embracing said talc in forming a composite bar for retaining said powder in bar form against cracking, chipping and crumbling and having the property of wearing away at the end of the bar with the powder when said stick has the end rubbed over the surface of the skin to apply a coating of talc thereto.

9. A talcum powder stick, consisting of talc compressed into bar form to a point so as to retain its shape but friable in handling without a retaining coating and a polymerized vinyl compound coating said talc in forming a composite bar for retaining said powder in bar form against cracking, chipping and crumbling and having the property of wearing away at the end of the bar with the powder when said stick has the end rubbed over the surface of the skin to apply a coating of talc thereto.

10. A talcum stick comprising talc compressed into bar form sufficiently to retain its shape but friable in handling without a retaining coating and an organic film forming material coating said talc as a film to form a composite bar for retaining said powder in bar form against cracking, chipping and crumbling and having the property of wearing away at the end of the bar with the powder when said stick has the end rubbed over the surface of the skin to apply a coating of talc thereto.

11. A talcum stick comprising talc compressed into bar form sufficiently to retain its shape but friable in handling without a retaining coating and an organic plastic material coating said talc to form a composite bar for retaining said powder in bar form against cracking, chipping and crumbling and having the property of wearing away at the end of the bar with the powder when said stick has the end rubbed over the surface of the skin to apply a coating of talc thereto.

12. A talcum powder stick comprising talc compressed sufficiently into bar form to retain its shape but friable in handling without a retaining coating and a resinous material coating said talc to form a composite bar for retaining said powder in bar form against cracking, chipping and crumbling and having the property of wearing away at the end of the bar with the powder when said stick has the end rubbed over the surface of the skin to apply a coating of talc thereto.

ROBERT W. TEICHNER.